June 9, 1953 G. I. PIERCE 2,641,009
SEWER PIPE CLEANING APPARATUS
Filed Jan. 30, 1950
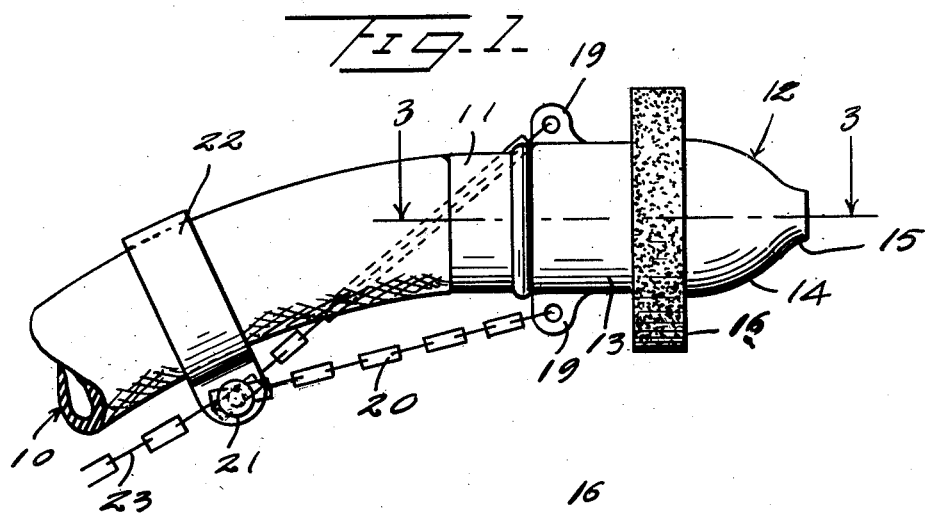
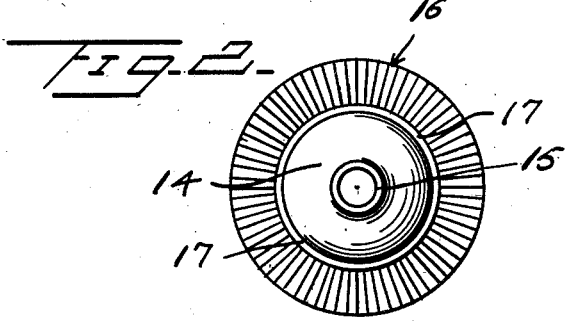
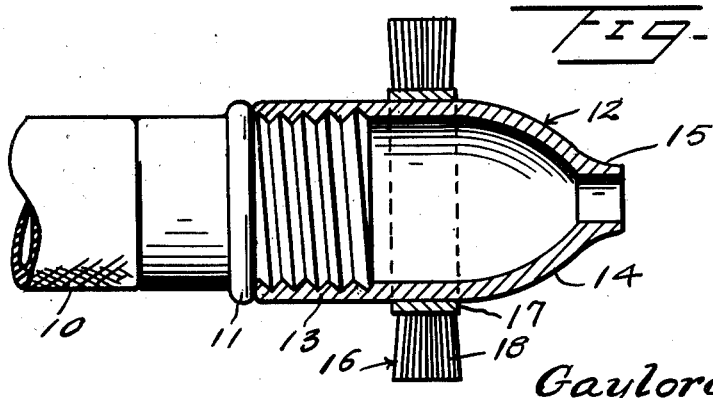
Inventor
Gaylord I. Pierce
By Kimmel & Crowell
Attorneys Patented June 9, 1953

2,641,009

UNITED STATES PATENT OFFICE 2,641,009

SEWER PIPE CLEANING APPARATUS

Gaylord I. Pierce, San Diego, Calif.

Application January 30, 1950, Serial No. 141,305

1 Claim. (Cl. 15—104.2)

This invention relates to pipe cleaner for sewer pipe or the like.

An object of this invention is to provide a cleaner for sewer or other pipes which includes a brush and an elongated flexible member secured to the brush, the flexible member being in the form of a hose, so that water or other liquid may be discharged under pressure into the pipe as it is being cleaned so as to wash out the accumulations.

Another object of this invention is to provide a pipe cleaning attachment for a hose whereby the attachment and the hose may be extended into the pipe and the walls of the latter cleaned by brushing and by washing.

A further object of this invention is to provide a pipe cleaning attachment for a hose which comprises a hollow combined ram and nozzle with bristles fixed to the ram, the device being capable of forcibly puncturing an obstruction while at the same time washing away the loose material and brushing the accumulated material from the wall of the pipe.

With the above and other objects in view, my invention consists in the arrangement, combination and details of construction disclosed in the drawings and specification, and then more particularly pointed out in the appended claim.

In the drawing:

Figure 1 is a detailed side elevation of a pipe cleaner constructed according to an embodiment of this invention.

Figure 2 is an end elevation of this device.

Figure 3 is a sectional view taken on the line 3—3 of Figure 1.

Referring to the drawing, the numeral 10 designates generally an elongated hose which is provided at one end thereof with a threaded coupling 11. A hollow ram head generally designated as 12 is threaded onto the coupling 11 and includes a cylindrical body 13 formed with interior threads which terminates at its forward end in a dome shaped or globular head 14 having a nozzle 15 extending from the center thereof. A circular brush 16 including an annular back 17 and bristles 18 is secured to the cylindrical body 13 rearwardly from the head 14, and the cylindrical back or body 17 is adapted to be fixedly secured to the body 13 in any suitable manner. The body 13 is formed with a pair of diametrically opposed ears 19 adjacent the rear thereof, and a pair of chains 20 are secured to the ears 19. The chains 20 are connected to a bolt 21 which extends through a clamping band 22 engaging about the hose 10 rearwardly of the coupling 11 to prevent slack and the consequent possibility of fouling the chains 20 in brush 16. A single chain 23 extends rearwardly from the band 22 and is adapted to terminate substantially at the end of the hose 10.

In the use of this device the ram 12 is threaded on the coupling 11 of the hose, and the band 22 is clamped about the hose 10 rearwardly of the coupling 11 at a distance sufficient to take up any slack in chains 20 and also to impart a slight bend to the hose under those conditions in which such bend is desirable. The chain 23 is disposed along the length of the hose 10 terminating substantially at the rear end of the hose.

The ram 12 is then extended into the pipe which is to be cleaned, and the chain 23, provides a means whereby the hose may be pulled out of the pipe without any pulling stress being applied to the hose. Chain 20 provides a safety device to preclude loss of nozzle 12 in the event the same becomes disengaged from hose 10 while in the pipe. The hose 10 is preferably connected to a source of water supply so that a small jet or stream of water will be discharge through the nozzle 15 as the ram 12 is pushed forwardly in the pipe. The brush 16 will clean the accumulations on the inside of the pipe and the accumlations when loose will be forced through the pipe by the water which is discharged from the nozzle 15. The pipe cleaning device hereinfore described will provide an improved means whereby a conventional hose may be converted into a snake or flexible handle for the ram. This device will provide an effective means for cleaning out sewer or other pipes, and by providing a device of this kind for mounting on the hose, the latter will have sufficient rigidity so that the hose with the ram and brush may be forced into the pipe and against an obstruction for removing the latter.

What is claimed is:

In combination an elongated hose, a threaded coupling on one end of said hose, a hollow body threaded on said coupling, said body including a tapered nose with a reduced diameter nozzle extending from said nose, a circular brush having an annular back fixed to and engaging about said body rearwardly of the tapered nose thereof, a pair of ears carried by said body rearwardly of said brush, a band separably secured about said hose rearwardly of said body, apertured ears on the ends of said band, a bolt connecting said ears, a pair of chains each secured between one of said first-mentioned ears and said bolt, and an elongated chain secured to said bolt and extending rearwardly along said hose for withdrawing said hose and body without the application of pulling stress to said hose.

GAYLORD I. PIERCE.

References Cited in the file of this patent

UNITED STATES PATENTS

| Number | Name | Date |
|---|---|---|
| 671,429 | Bacon | Apr. 9, 1901 |
| 813,739 | Ross | Feb. 27, 1906 |
| 1,154,390 | Foster | Sept. 21, 1915 |
| 1,498,446 | Geskey | June 17, 1924 |
| 1,803,425 | Cunningham | May 5, 1931 |
| 2,238,969 | Butterfield | Apr. 22, 1941 |
| 2,410,753 | Shinomiya | Nov. 5, 1946 |
| 2,559,757 | Chandler | July 10, 1951 |
| 2,568,347 | Lundelius | Sept. 18, 1951 |

FOREIGN PATENTS

| Number | Country | Date |
|---|---|---|
| 430,912 | Great Britain | June 24, 1935 |